Nov. 11, 1969   TAKAICHI MABUCHI   3,477,173
MOTOR-DRIVEN SCREW PROPELLER DEVICE
Filed Dec. 8, 1966   4 Sheets-Sheet 1

INVENTOR
Takaichi Mabuchi
BY   ATTYS.

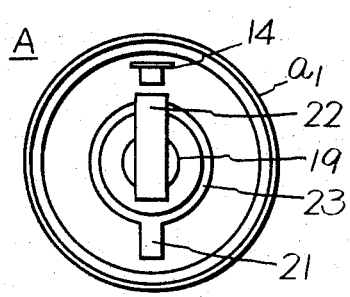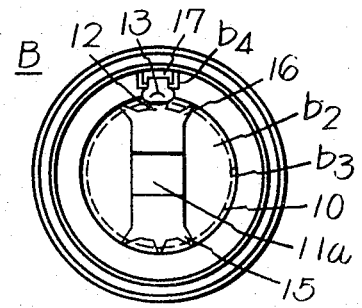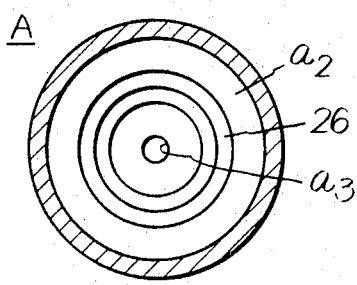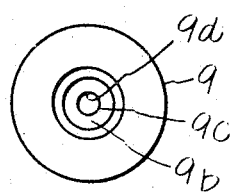

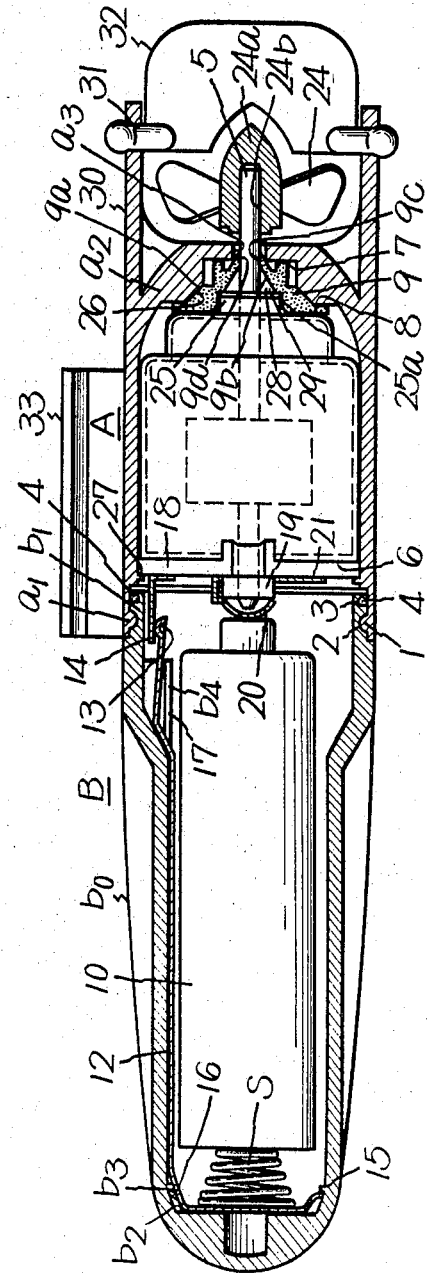

Nov. 11, 1969   TAKAICHI MABUCHI   3,477,173
MOTOR-DRIVEN SCREW PROPELLER DEVICE
Filed Dec. 8, 1966   4 Sheets-Sheet 4

INVENTOR
Takaichi Mabuchi
BY Hill, Sherman, Meroni, Gross & Simpson
ATTYS.

United States Patent Office 3,477,173
Patented Nov. 11, 1969

3,477,173
MOTOR-DRIVEN SCREW PROPELLER DEVICE
Takaichi Mabuchi, Tokyo, Japan, assignor to Tokyo Kagaku Kabushikikaisha, Tokyo, Japan, a corporation of Japan
Filed Dec. 8, 1966, Ser. No. 600,095
Claims priority, application Japan, Aug. 3, 1966, 41/50,927
Int. Cl. A63h 33/26
U.S. Cl. 46—243
10 Claims

ABSTRACT OF THE DISCLOSURE

A motor-driven screw propeller device including first and second, telescopically connected cylindrical case members, a motor housed in said first case member, a rotary shaft of said motor projecting outwardly of said first case member, a screw propeller attached to said projecting end of said rotary shaft, a battery housed in said second case member, means for alternatively connecting and disconnecting said battery with said motor. The first cylindrical case member is formed with an inwardly projecting flange on an inner wall thereof for positively retaining the motor in position to maintain a hermetic seal between the housing and the motor shaft.

---

This invention relates to a motor-driven screw propeller device particularly for toy ships or the like.

One object of this invention is to provide a motor-driven screw propeller device of the type comprising first and second cylindrical case members enclosing a miniature motor and a power source battery and assembled together in a watertight manner, which is designed so that power source switch elements provided within the case members are engaged with or disengaged from each other by the relative rotation of the two case members.

Another object of this invention is to provide a simple motor-driven screw propeller device in which the rotary shaft of a miniature motor housed in a cylindrical case member is projected out of the case member in a watertight manner.

Another object of this invention is to provide a motor-driven screw propeller device which is adapted so that a miniature motor is resiliently fitted into a cylindrical case member.

Still another object of this invention is to provide a motor-driven screw propeller device which is designed so that when cylindrical case members respectively enclosing a miniature motor and a power source battery are assembled together the electrical connection between the battery and the motor is established by resilient means.

Other objects, features and advantages of this invention will become apparent from the following description taken in conjunction with the accompanying drawings, in which:

FIGURE 2 is a front view showing an engaging portion of one of cylindrical plastic case members of the device depicted in FIGURE 1;

FIGURE 3 is a cross-sectional view taken along the line I—I in FIGURE 1 and illustrating the inner wall of the end portion of the cylindrical plastic case member shown in FIGURE 2;

FIGURE 4 is a front view of a resilient plate interposed between a miniature motor and the inner wall of the end portion of the cylindrical plastic case member;

FIGURE 5 is a front view of the other cylindrical plastic case member;

FIGURE 6 is a longitudinal sectional view illustrating another example of the device of this invention;

Figure 1:
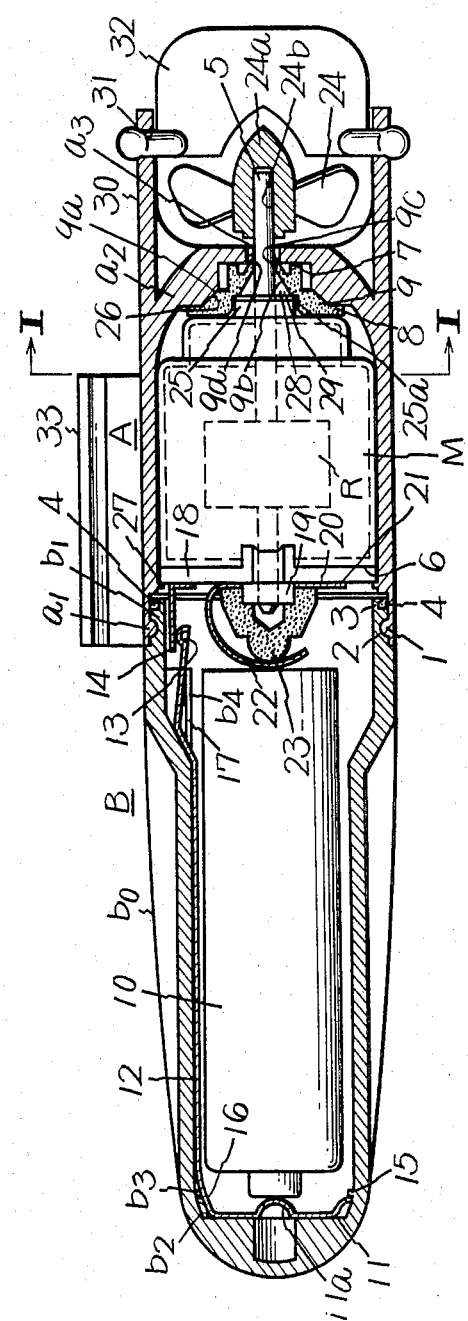
FIGURE 1 is a longitudinal sectional view illustrating one example of a motor-driven propeller device produced according to this invention.

With reference to the drawings the present invention will be described in detail. A motor-driven propeller device of this invention comprises first and second cylindrical plastic case members A and B having at one end thereof thin marginal portions $a_1$ and $b_1$ which are resiliently deformed to be engaged with each other so as to ensure assembling of the case members in a watertight manner. These engaging marginal portions are thinner than the cylindrical case members proper the thin marginal portion $a_1$ of the first case member A having a projecting flange 1 on the inside thereof and the thin marginal portion $b_1$ of the second case member B having an annular groove 2 on the outside thereof to be engaged with the projecting flange 1. The thin marginal portions $a_1$ and $b_1$ thus formed are forced into engagement with each other. In this case, an annular groove 3 is provided on the outside of the thin marginal portion of the second case member B and a rubber ring 4 is fitted in the groove 3 so as to prevent water from leaking into the inside through the engaging portion from the outside when the two cylindrical plastic case members A and B are assembled together as depicted in FIGURE 1. Reference character $b_0$ indicates a rib formed longitudinally on the periphery of the second cylindrical plastic case member B integrally therewith.

The first cylindrical plastic case member A houses a miniature motor M, the rotary shaft 5 of which projects outside of a conical end portion $a_2$ of the case member through an aperture disposed centrally of the end portion $a_2$. Further, a resilient plate 9 such as depicted in FIGURE 4 is interposed between the inner wall 7 of the end portion $a_2$ and an end cover 8 of the motor casing 6 so as to maintain the interior of the cylindrical case member in a watertight manner. Reference character R indicates a rotor of the motor M.

The second cylindrical plastic case member B encloses therein a battery 10 and a resilient contact member 11 making contact with the negative electrode of the battery 10 is led out in the vicinity of the marginal portion $b_1$ of the cylindrical plastic case member B through a resilient conductor 12 disposed along the inner wall of the cylindrical case member B, providing a terminal 13. While a terminal 14 connected to the miniature motor M is located in the neighborhood of the thin marginal portion $a_1$ of the first cylindrical plastic case member A. With such an arrangement, the terminals 13 and 14 can be engaged with or disengaged from each other by turning the assembled first and second plastic case members A and B with hands. This avoids necessity of special provision of a switch for the power source circuit and a contact portion on the outside of the case members. That is, the device of this invention is designed so that the terminals 13 and 14 are engaged with or disengaged from each other by the relative rotation of the assembled plastic case members maintained in a watertight manner, thereby switching on or off the circuit constituted.

The following will describe the switching mechanism in detail. The resilient contact member 11 making contact with the positive electrode of the battery 10 has a portion 11$a$ resiliently projecting toward the positive electrode as illustrated in FIGURES 1 and 5. In order to hold the contact member 11 in position on the inside of the second cylindrical plastic case member B, the second plastic case member B has a ring-shaped projecting flange $b_3$ formed near the inner end portion $b_2$, while the resilient contact member 11 has lugs 15 and 16 at the end and at that portion which crosses the projecting flange $b_3$ and is contiguous to the resilient conductor 12 as shown in FIGURES 1 and 5, the lugs 15 and 16 being engaged with the projecting flange $b_3$ so as to ensure holding of the resilient contact member 11 in position. Further, the resilient contact member 11 is led out to the engaging marginal portion $b_1$ through the conductor 12 as described previously, but in this case in order to hold the terminal 13 in position near the marginal portion of the second plastic case member B, a pair of projecting pieces are provided near the marginal portion $b_1$, defining a guide groove 17 to effectively prevent movement of the terminal 17 in the circumferential direction of the plastic case member B. Then, the connection means consisting of the resilient contact member 11, the conductor 12 and the terminal 13 is pressed into the second cylindrical plastic case member B, the lugs 15 and 16 being resiliently engaged with the ring-shaped projecting flange $b_1$ and the conductor 12 being fitted into the guide groove 17 in the vicinity of the terminal 13.

Meanwhile, the terminal 14, connected to the motor M through an insulation plate 18 for supporting the motor M, is positioned at such a location as to contact with the aforementioned terminal 13. That is, the relative arrangement of the terminal 14 to that 13 is such that by turning the first and second cylindrical plastic case members A and B with hands, the terminals 13 and 14 are engaged with each other to perform the function of a switch.

The motor supporting insulation plate 18 has a motor bearing disposed centrally thereof, around which a conductive ring 20 is fitted, as clearly illustrated in FIGURES 1 and 2. The conductive ring 20 has a conductor 21 leading to the motor M and a central terminal 22 extending from the position diametrically opposite to the conductor 21 and making contact with the negative electrode of the battery 10. This central terminal 22 is resilient and is adapted to press the battery 10 against the resilient contact member 11 provided on the inner wall $b_2$ of the end portion of the second cylindrical plastic case member B. In this case, in order to prevent deformation of the central terminal 22 in excess of its elastic limit, a rubber tip 23 is employed which is fitted on the bearing 19 and interposed between the conductive ring 20 and the inner side of the central terminal 22. This eliminates the possibility that the central terminal 22 becomes too much curved toward the conductive ring 20 in excess of its elastic limit to stand further use. At the same time, the rubber tip 23 facilitates by its resiliency the resilient pressing of the battery 10 by the central terminal 22.

In order to maintain the motor M and a power source battery 10 for driving it and their connections in a watertight manner, the first and second cylindrical plastic case members A and B are assembled together in a watertight manner by means of the engaging margins $a_1$ and $b_1$, and the assembled case members A and B are adapted to be turned relative to each other in the assembled condition. Further, the rotary shaft 5 of the rotor R of the motor M is projected outside of the case member A and the projecting end of the rotary shaft 5 has attached thereto a screw propeller 24. Also in this case, a watertight construction is required, which will hereinbelow be described. That is, a bearing hub 25 is provided on the end cover 8 of the motor casing 6 and a resilient plate 9 is provided which makes contact with the circumferential surface 25a of the bearing hub 25 and the end cover 8 of the motor casing 6. The surface 9a of the resilient plate 9 on the opposite side from the motor casing 6 is pressed against an inclined shoulder portion 26 formed on the inner wall of the conical end portion $a_2$ of the first cylindrical plastic case member A, as depicted in FIGURES 1 and 3. Meanwhile, a ring-shaped projecting flange 27 is provided inside of the engaging marginal portion $a_1$ of the case member A. When the motor M is inserted into the case member A as shown in FIGURE 1, it is forcibly pushed into the case member A past the ring-shaped projecting flange 27 by the deformation of the engaging marginal portion $a_1$. In the assembled condition the ring-shaped projecting flange 27 and the insulation plate 18 engage with each other and the motor M presses the resilient plate 9 against the inclined shoulder portion 26 of the conical end portion $a_2$. Thus, the interior of the assembled case members is held in a watertight manner.

In addition, the resilient plate 9 has a ring-shaped projecting margin 9b and its extremity 9c is designed so that the rotary shaft 5 is projected out through a central aperture 9d as in a watertight manner as possible, and further a chamber 28 formed inside of the ring-shape projecting margin 9b is filled with grease 29 so as to facilitate the rotation of the rotary shaft 5. The presence of the grease ensures to maintain the rotary shaft 5 and the resilient plate 9 in a watertight manner.

FIGURE 6 illustrates another modified form of this invention, showing a modification of the electric circuit connecting the battery and the motor. In this example, a conductor 12 making contact with the neagtive electrode of the battery 10 is disposed along the inner wall of a second cylindrical plastic case member B, and one end of the conductor 12 extends to the inner end of the case member, while the other end serves as a terminal 13. The battery 10 is inserted into the case member in a manner so as to press a coiled spring S against the extended end portion of the conductor 12. As in the example illustrated in FIGURE 1, the conductor 12 is fitted in a guide groove formed by a pair of projecting pieces $b_4$ so as to prevent unwanted movement of the terminal 13 in the circumferential direction of the case member B.

A motor supporting insulation plate 18 has a centrally disposed bearing 19, around which a conductive ring 20 is fitted. The conductive ring 20 has a conductor 21 leading to the motor, while the conductive ring 20 itself serves as a central terminal contacting with the plus side of the battery 10. That is, in this example, the battery 10 is firmly held between the coiled spring S and the conductive ring 20 by the resiliency of the spring S. This avoids the possibility that the battery 10 gets out of position when the cylindrical plastic case members A and B are rotated relative to each other so as to effect the switching operation of terminals 13 and 14.

The foregoing has been made in connection with the case where the first and second case members A and B made of a plastic material are assembled together by means of their corresponding engaging margins capable of being resiliently deformed. However, it is also possible that the two plastic case members A and B are assembled together by means of a screw which threadably engages with the engaging margins of the both case members. Further, it is also possible that the first case member A is threadably engaged with the case member B made of a metal. In such a case, the resilient conductor 12 is left out and the end of the battery 10 is contacted directly with inner end of the metal case member B through the spring S as depicted in FIGURE 6. In the proximity of the engaging margin of the case member B a resilient contact member corresponding to the contact member 12 is placed on the inner wall of the case member and the terminal 14 connected to the motor is disposed opposite to the end of the resilient contact member so that the resilient contact member and the terminal 14 may be engaged with or disengaged from each other by the relative rotation of the first and second case members A and B. This simplifies the mutual connection of the motor and the battery and ensures switching operation of the circuit within the case members by the relative rotation of the case members A and B without providing a switch on the outside of the case members. In some cases, it is possible that the closure end of the case member A is provided separately of the case member and is assembled together therewith.

The screw propeller 24 is attached to the rotary shaft 5 projecting outside of the case member A while being maintained in a watertight manner as has been described in the foregoing. The screw propeller 24 has a rubber piece 24a having a hole 24b, into which the rotary shaft 5 is inserted to mount thereon the screw propeller 24 resiliently and detachably. Further, the first plastic case member A has projeced therefrom a pair of arms 30 each having an aperture 31 at the projecting end, and a rudder 32 is disposed between the projecting arms 30, having its end fitted into the holes 31, in such a manner as to be rotated with suitable friction.

A description will be given in connection with means for attaching the above-described device to a toy ship or the like. Namely, the device of this invention is mounted on the toy through such an attaching means provided on either one of the case members A and B. In the illustrated example the first cylindrical plastic case member A has an attachment portion 31 formed integrally therewith on the outside. The attachment portion 31 has a longitudinal engaging groove 34 defined by wall members 35 which is resilient. The groove 34 is substantially ring-shaped in cross section. That is, the attachment portion 31 is adapted so that the resilient wall members 35 are pushed outwards to spread out the groove 34 and an engaging portion 36 attached to the toy is fitted into the groove 34.

Figure 7:
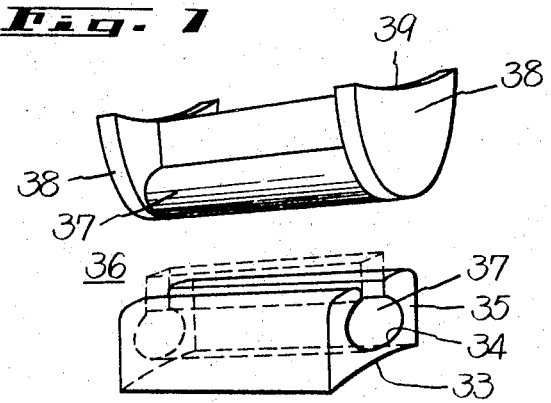
FIGURE 7 illustrates in perspective one example of means for attaching the device of this invention to, for example, a toy ship.

In the example shown in FIGURE 7 an engaging member 36 is provided which has a projection 37 to be inserted into the engaging groove 34 of the attachment member 33. The engaging member 36 consists of the projection 37 and the plate members 38 and has an attachment surface 39. It is of course preferred that the surface 39 is of a suitable shape conforming with the attachment portion of the toy, and the engaging member 36 is attached to the toy through a suitable adhesive binder. It is also possible to attach the engaging member to the toy detachably. In the illustrated example the projection 37 is designed so that it is pressed into the groove 34 through the resilient projection 35 of the attachment member 33 and the inner surfaces of the plate members 38 engage with the outer faces of the both ends of the resilient projection 35, and hence the plate members 38 prevent the projection 37 from moving in the lengthwise direction of the groove 34.

Figure 8:
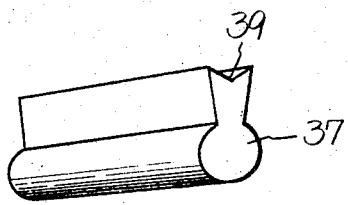
FIGURES 8 and 9 similarly illustrate in perspective other examples of the attaching means.

FIGURE 8 illustrates a modified form of the engaging member 36 which is provided with the projection 37 only, and in this case the projection 37 is inserted into the groove 34 while being pushed along the wall members forming the groove 34. The engaging member 36 has also a surface 39 conforming to the attachment portion of the toy.

Figure 9:
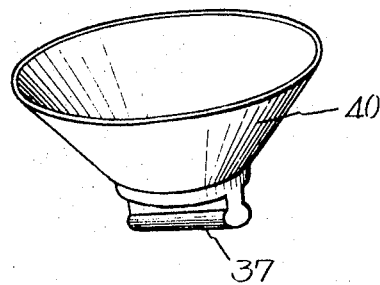

FIGURE 9 shows another modification of the engaging member 36, which has the projection 37 as in the foregoing examples and an absorber 40. That is, a dishlike adsorbing portion made of rubber is formed integrally with the engaging projection, and the projection is inserted into the groove 34 in the same manner as in FIGURE 8. The use of such an engaging member ensures that the device of this invention may easily be assembled with or disassembled from the toy.

It will be apparent that many modifications and variations may be effected without departing from the scope of the novel concepts of this invention.

What I claim is:

1. A motor-driven screw propeller device comprising: first and second cylindrical case members; a miniature motor housed in said first cylindrical case member; said first cylindrical case member having an aperture disposed centrally of a closed end thereof; a rotary shaft projecting from said miniature motor through said aperture of said first cylindrical case member; a resilient plate inserted between said miniature motor and a conical end portion of said first cylindrical case member surrounding said aperture thereof; a screw propeller attached to the projecting end of said rotary shaft; a battery housed in said cylindrical case member for driving said motor; battery connecting means consisting of a contact member connected with one electrode of said battery and connected with one terminal of said miniature motor and another contact member connected with the other terminal of the battery; resilient means holding said battery between said contact members; and a projection formed integrally with said first cylindrical case member on an inner wall thereof and extending inwardly, whereby said inwardly extending projection is deformed when said miniature motor is forcibly inserted into said first cylindrical case member over said projection to positively hold said miniature motor in position against said resilient plate for maintaining said rotary shaft of said miniature motor in engagement with said aperture to affect a hermetic seal therebetween.

2. A motor-driven screw propeller device as defined in claim 1, wherein said projection includes a ring-shaped inwardly projecting flange.

3. A motor-driven screw propeller device as claimed in claim 1, wherein said first and second cylindrical case members are composed of plastic material so as to easily form engaging margins capable of being resiliently deformed to be engaged with each other to affect a hermetic seal therebetween.

4. A motor-driven screw propeller device as claimed in claim 1, wherein said battery connecting means consists of a resilient conductor disposed along an inner wall of said second cylindrical case member and a terminal connected to the miniature motor, one end of said resilient conductor contacting one electrode of said battery at an end portion of said second cylindrical case member, said first and second cylindrical case members having engaging margins formed thereon, another end of said resilient conductor projecting outwardly adjacent said engaging margin of said first cylindrical case member to form a terminal cooperating with a terminal connected to said miniature motor, said last-mentioned terminals being engaged with or disengaged from each other when said first and second cylindrical case members are rotated relative to each other.

5. A motor-driven screw propeller device as claimed in claim 1, wherein said first cylindrical case member has an inclined shoulder portion formed integrally therewith on an inside surface of said end closure thereof for snugly retaining said resilient plate, and said resilient plate has a dish-shaped configuration.

6. A motor-driven screw propeller device as claimed in claim 1, wherein a guide groove is formed on an inner wall of said second cylindrical case member and disposed parallel with a longitudinal axis of said second cylindrical case member for receiving therein an elongated portion of one of said contact members.

7. A motor-driven screw propeller device as claimed in claim 1, wherein said battery connecting means includes a resilient conductor disposed along an inner wall of said second cylindrical case member, a terminal connected to said miniature motor, one end of said resilient conductor contacting one electrode of said battery at an end portion of said second cylindrical case member, another end portion of said resilient conductor projecting outwardly adjacent an engaging margin formed on said first cylindrical case member, said last-mentioned end portion of said resilient conductor serving as a terminal cooperating with said terminal connected to said miniature motor, another terminal connected to said miniature motor consisting of a conductive ring disposed centrally of an outer end cover of said miniature motor and a curved, resilient member having a free end thereof contacting a second electrode of said battery, a rubber member interposed between said conductive ring and said last-mentioned resilient member to prevent said resilient member from being deformed in excess of its elastic limit.

8. A motor-driven screw propeller device as claimed in claim 1, wherein each of said first and said second cylindrical case members includes an engaging margin capable of being resiliently deformed to engage said other margin to form a hermetic seal therebetween, each said engaging margin having a thin marginal portion, said thin marginal portion of said first cylindrical case member having a projecting flange formed on an inwardly projecting wall thereof, said thin marginal portion of said second cylindrical case member having an annular groove formed on an outwardly projecting wall thereof and engaged with said projecting flange, said thin marginal portions being telescopically forced into engagement with each other to cause said projecting flange to enter said annular groove.

9. A motor-driven screw propeller device as claimed in claim 1, wherein said battery connecting means includes a conductor disposed along said second cylindrical plastic case member, one end portion of said conductor extending to an inner end wall of said second cylindrical case member and another end portion thereof extending to engaging margins formed on said first and said second cylindrical case members, a coiled spring disposed adjacent said inner end wall of said second cylindrical case member and contacting said first-mentioned end portion of said conductor, a centrally disposed conductor connected to a terminal of said motor, said battery disposed between said coiled spring and said centrally disposed conductor, a second terminal connected to said motor and adapted to be engaged with or disengaged from said first-mentioned conductor by relative rotation of said first and said second cylindrical case members.

10. A motor-driven screw propeller device as claimed in claim 1, wherein said first and second cylindrical case members further include an attachment member formed on an outer circumferential surface of said case members and formed to detachably engage a cooperating member provided on an object to be propelled.

References Cited
UNITED STATES PATENTS

| | | | |
|---|---|---|---|
| 3,000,128 | 9/1961 | McAda | 46—243 X |
| 3,036,403 | 5/1962 | Presnell | 46—243 |

F. BARRY SHAY, Primary Examiner

ROBERT F. CUTTING, Assistant Examiner

U.S. Cl. X.R.

46—93